(12) United States Patent
Ban et al.

(10) Patent No.: US 7,280,687 B2
(45) Date of Patent: Oct. 9, 2007

(54) DEVICE FOR DETECTING POSITION/ORIENTATION OF OBJECT

(75) Inventors: Kazunori Ban, Yamanashi (JP); Ichiro Kanno, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 781 days.

(21) Appl. No.: 10/648,192

(22) Filed: Aug. 27, 2003

(65) Prior Publication Data

US 2004/0041808 A1 Mar. 4, 2004

(30) Foreign Application Priority Data

Sep. 2, 2002 (JP) .............................. 2002-256756

(51) Int. Cl.
G06K 9/00 (2006.01)
G06K 9/36 (2006.01)

(52) U.S. Cl. ...................... 382/154; 382/285; 345/419; 356/12; 348/42; 359/462

(58) Field of Classification Search ................ 382/154, 382/285; 345/419–427; 356/12–14; 348/42–60; 359/462–477

See application file for complete search history.

(56) References Cited

U.S. PATENT DOCUMENTS

| | | | | |
|---|---|---|---|---|
| 5,821,943 A | * | 10/1998 | Shashua | 345/427 |
| 6,434,278 B1 | * | 8/2002 | Hashimoto | 382/285 |
| 6,721,444 B1 | * | 4/2004 | Gu et al. | 382/154 |
| 7,177,459 B1 | * | 2/2007 | Watanabe et al. | 382/151 |
| 2006/0120590 A1 | * | 6/2006 | Han et al. | 382/154 |

FOREIGN PATENT DOCUMENTS

JP 62-047512 3/1987
JP 08-047881 2/1996

(Continued)

OTHER PUBLICATIONS

Japanese Office Action for corresponding Japanese Application No. 2002-256756 mailed Sep. 21, 2004.

(Continued)

Primary Examiner—Bhavesh M Mehta
Assistant Examiner—Aaron W Carter
(74) Attorney, Agent, or Firm—Staas & Halsey LLP

(57) ABSTRACT

A position/orientation detecting device for detecting a three-dimensional position/orientation of an object such as a workpiece in a stereo mode of highly reliable determination of corresponding images, which is suitable for use to be combined with a robot to constitute an object picking apparatus. Pictures of workpieces are taken by video cameras. Two-dimensional taught models are created by model creating means and stored as model information, and the positions of three or more reference points are determined by reference point position setting means. Object detecting sections detect images of workpieces using the model information. A corresponding image determining section determines corresponding images, using models or images which are prepared by performing geometrical transformation (represented by a set of parameters) on the two-dimensional taught models or the two-dimensional images. A position/orientation calculating section obtains a three-dimensional position of each of the reference points on each of the workpieces, and thereby obtains the position/orientation of each of the workpieces.

18 Claims, 4 Drawing Sheets

FOREIGN PATENT DOCUMENTS

| | | |
|---|---|---|
| JP | 2000-227309 | 8/2000 |
| JP | 2000-288974 | 10/2000 |
| WO | WO/0057129 | 9/2000 |
| JP | 08-105720 | 4/1996 |
| JP | 08-136220 | 5/1996 |

OTHER PUBLICATIONS

Interrogation dated Dec. 26, 2006 in corresponding Japanese Patent Application No. 2002-256756.

Japanese Patent Office Notice of Reasons for Rejection, mailed Apr. 3, 2007 and issued in corresponding Japanese Patent Application No. 2002-256756.

* cited by examiner

DEVICE FOR DETECTING POSITION/ORIENTATION OF OBJECT

BACKGROUND OF THE INVENTION

1. Field of the Invention

The present invention relates to a device for detecting a three-dimensional position/orientation of an object such as one of workpieces stacked randomly, which is suitable for use in an apparatus for picking up an object using a robot.

2. Description of Related Art

As a method of detecting a three-dimensional position/orientation of an object such as a workpiece on the basis of a picture of the object taken by a video camera, there is know a method called a stereo mode in which a plurality of video cameras are used. In some cases, three or more video cameras are used, however, those cases can be reduced to a stereo mode using two video cameras, by focusing on two of the video cameras. Hence, the description below will be limited to the case in which only two video cameras are used.

What is difficult in detecting an object in the stereo mode is so-called "determination of corresponding images", namely determining which part of a picture taken by a video camera corresponds to an image of a particular part of an object detected in a picture taken by another video camera. An example of determination of corresponding images is seen in, for example, Japanese Patent No. 3235364. In this Patent, determination of corresponding images is performed, limiting to those objects which have a contour including a circular or circular-arc part, and depending on the fact that pictures are locally similar, and the fact that characteristic points are distributed in a circular arc.

Like this, generally in the stereo mode, an attempt to identify corresponding images is made on a local basis. However, since it is based on the local comparison between pictures, accuracy and reliability tends to be unsatisfactory. This is because it is expected that in not a few cases, the probability of the local comparison of pictures finding a lot of similar parts will not be low.

There is a technique which takes geometrical restrictions obtained from arrangement of two video cameras (epipolar restriction, etc.) into consideration to thereby improve the reliability of the determination of corresponding images. However, the technique is not adequate in many cases. Needless to say, error in determination of corresponding images directly leads to error in detection of the position of an object. In the above-mentioned Japanese Patent No. 3235364, reliability is improved by defining the shape of an object to be detected more specifically and thereby increasing restrictions in the determination of corresponding images.

However, as a matter of course, this technique has a drawback that it narrows the range of detectable objects.

Further, the conventional method of detecting a three-dimensional position/orientation of an object in the stereo mode has a problem that if objects overlap, so that part of an object is hidden behind another object, determination of corresponding images cannot be performed on the partly hidden object.

SUMMARY OF THE INVENTION

The invention provides a device for detecting a position/orientation of an object in which no particular restriction is placed on the shape of an object to be detected, and which can detect an object of a general shape in a stereo mode on the basis of highly reliable determination of corresponding images. Also, the invention provides a device for detecting a position/orientation of an object in which determination of corresponding images can be performed on an object of which a part is hidden behind another object.

The invention employs a method in which a position/orientation of each object is obtained through the process of taking pictures of objects such as workpieces stacked randomly in a stereo mode, detecting images of objects in each of the pictures using a two-dimensional taught model representing the object, identifying which one of images detected in one of the pictures corresponds to which one of images detected in another one of the pictures, and calculating the three-dimensional position of each of reference points which are defined in advance on the two-dimensional taught model.

According to a first aspect of the present invention, there is provided a device for detecting a three-dimensional position/orientation of an object based on two-dimensional pictures of the object taken from a plurality of different visual points. The device comprises defining means for defining two-dimensional taught models of the object and at least three reference points on the respective two-dimensional taught models; image detecting means for detecting images of the object in each of the two-dimensional pictures by matching using the two-dimensional taught models; corresponding image determining means for determining correspondence between the image detected in one of the two-dimensional pictures and the image detected in another one of the two-dimensional pictures; reference point position calculating means for obtaining a position of each of the reference points on each of the detected images using positions of the reference points defined on the two-dimensional taught models; and three-dimensional position/orientation determining means for obtaining three-dimensional position of each of the reference points based on the obtained position of each of the reference points on each of the detected images, and determining the three-dimensional position/orientation of the object using the obtained three-dimensional positions of the reference points.

According to a second aspect of the present invention, there is provided a device for detecting a position/orientation of each of a plurality of objects of the same type based on two-dimensional pictures of the group of objects taken from a plurality of different visual points. The device comprises defining means for defining two-dimensional taught models of the objects and at least three reference points on the respective two-dimensional taught models; image detecting means for detecting images of one or more of the plurality of objects in each of the two-dimensional pictures by matching using the two-dimensional taught models; corresponding image determining means for determining which one of images detected in one of the two-dimensional pictures corresponds to which one of images detected in another one of the two-dimensional pictures as images of the same object; reference point position calculating means for obtaining a position of each of the reference points on each of the images determined as one of the images of the same object, using positions of the reference points defined on the two-dimensional taught models; and three-dimensional position/orientation detecting means for obtaining the three-dimensional position of each of the reference points based on the obtained position of each of the reference points on each of the two-dimensional images, and obtaining the three-dimensional position/orientation of each of the objects using the obtained three-dimensional positions of the reference points.

In each of the above devices, the image detecting means may include means for preparing variable two-dimensional taught models by performing a geometrical transformation represented by a set of parameters on the two-dimensional taught model, and detecting images of objects in each of the two-dimensional pictures using the variable two-dimensional taught models, and the reference point position calculating means may include means for obtaining the position of each of the reference points on each of the images based on values of the set of the parameters determined in detecting each of the images.

In each of the above devices, the image detecting means may include means for preparing variable two-dimensional pictures by performing a geometrical transformation represented by a set of parameters on the two-dimensional pictures, and detecting images of objects in each of the variable two-dimensional pictures using the two-dimensional taught model, and the corresponding image determining means and the reference point position calculating means may include means for obtaining position of each of the reference points on each of the images before the geometrical transformation based on values of the set of the parameters determined in detecting each of the images.

Here, in the case where transformation is performed on the two-dimensional taught model, the set of parameters may include parameters representing affine transformation or perspective transformation to be performed on the two-dimensional taught model. In the case where transformation is performed on the two-dimensional pictures, the set of parameters may include parameters representing affine transformation or perspective transformation to be performed on the two-dimensional pictures.

Instead of defining at least three reference points on the two-dimensional taught model, a figure which provides information equivalent to the information that the at least three reference points provide may be defined in a manner that the three-dimensional positional relationship between the figure and the two-dimensional taught model is fixed.

An object picking-up apparatus can be constructed by combining the above position/orientation detecting device with a robot, where the robot can pick up an object whose three-dimensional position/orientation has been detected by the position/orientation detecting device. The three-dimensional position/orientation detected by the position/orientation detecting device can be utilized for controlling the robot, If there are more than one object of which the positions and orientations have been detected, which object should be picked up next can be determined according to a picking-up priority rule laid down appropriately (for example, a rule that the uppermost object should be picked up first).

DETAILED DESCRIPTION

Referring to FIGS. 1 to 4, an embodiment of the invention will be described. The embodiment will be described using an example of a workpiece picking-up apparatus in which a position/orientation detecting device for detecting a three-dimensional position/orientation of a workpiece (an example of an object) is combined with a robot.

Figure 1:
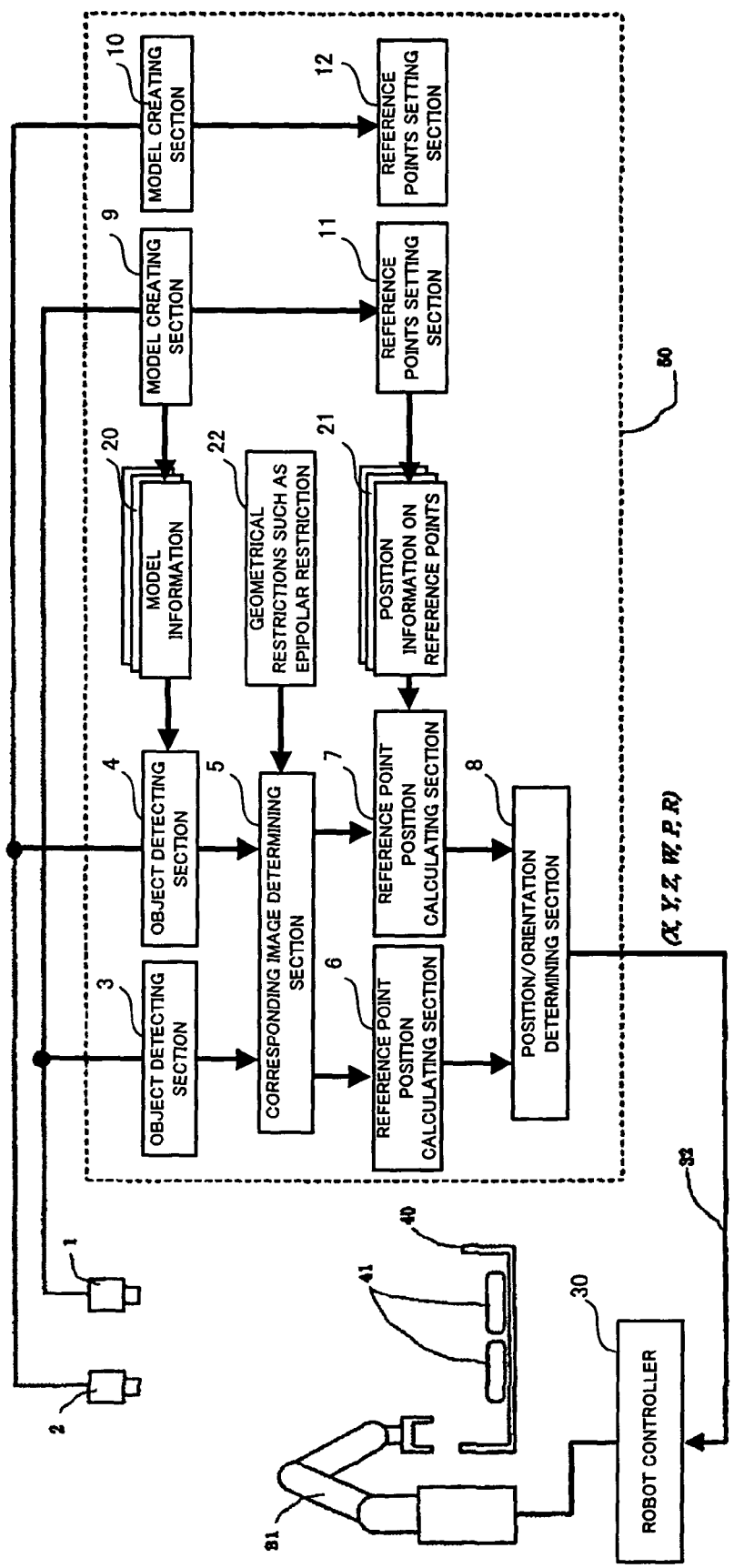
FIG. 1 is a diagram schematically showing the system architecture and operating process of an embodiment of the invention.

In FIG. 1, a plurality of workpieces 41 are placed stacked randomly in a workpiece container 40. The workpiece picking-up apparatus for picking up workpieces 41 comprises a robot 31 controlled by a robot controller 30, and a position/orientation detector (stereo-mode three-dimensional visual sensor) including two video cameras 1, 2 and an image processor 50. In FIG. 1, for convenience sake, the image processor 50 is shown by surrounding that part of a block diagram which shows the outline of processing performed by the image processor 50.

The robot 31 is set at a place suited to grasp and pick up the workpieces 41 in the workpiece container 40 one by one. The video cameras 1, 2 are set at places where the video cameras can have the workpieces 41 in the workpiece container 40 in their respective visual fields and take pictures of them approximately right above them. The robot controller 30 and the image processor 50 are connected by a communication line 32. The robot controller 30 handles the workpieces 41 (approaches, grasps and picks them up) utilizing the three-dimensional positions and orientations of the workpieces 41 obtained from pictures taken by the video cameras 1, 2 and processed by the image processor 50. How to obtain the three-dimensional positions and orientations of the workpieces 41 will be described later.

Normally, there are a plurality of workpieces of which the three-dimensional positions and orientations should be obtained. Thus, the workpiece to be picked up next is determined according to an appropriate priority rule. The priority rule may be so determined that the workpiece which is estimated to be easiest or close to being easiest to pick up at that time will be prioritized. For example, the priority rule may be so determined that among a plurality of workpieces of which the three-dimensional positions and orientations have been obtained, the workpiece located uppermost (having the largest Z-coordinate) will be picked up first. A priority rule which takes also the orientation of an object into consideration, and other various priority rules are thinkable. Hence, it is advisable to choose a rule suited to be applied that time. The invention places no particular restriction on the priority rule. In any case, since the three-dimensional positions and orientations of workpieces have been detected correctly, the workpieces can be handled easily.

Next, how to obtain the three-dimensional position/orientation of a workpiece 41 through stereo-mode image processing using the video cameras 1, 2 and the image processor 50 will be explained.

First, as preparation, regarding to-be-detected workpieces 41, creation of models and definition of reference points are performed as follows:

A workpiece 41 or an object imitating the workpiece 41 is placed in a reference position, and pictures thereof are taken by the video cameras 1 and 2. The pictures taken by the video cameras 1 and 2 are sent to model creating sections 9 and 10 (shown as blocks) of the image processor 50, separately, where two-dimensional taught models of the workpiece are created. The created two-dimensional taught models are stored in a memory (not shown) in the image processor 50 as model information 20. Further, regarding the created two-dimensional taught models, positions of at least three reference points are defined by a reference points setting sections 11, 12. The defined positions of the reference points are stored as reference point position information 21. Which points on the two-dimensional taught model should be the reference points can be chosen, for example, by displaying the two-dimensional taught model on a monitor attached to the image processor 50 and marking a point intended to be a reference point with a pointer using a mouse or the like.

The process so far will be explained briefly again, using a specific example, referring to FIGS. 2a and 2b. FIG. 2a shows an example of a workpiece (two-dimensional image), and FIG. 2b shows an example of a two-dimensional taught model stored as model information 20 for the workpiece. The two-dimensional taught model in the present embodiment is defined in an image coordinate system where the coordinate origin is at the upper left, X-axis extends downward, and Y-axis extends to the right. The form of the model can vary depending on the model detection technique. For example, if the model detection is normalized correlation detection performed on the pictures, the model shown in FIG. 2b is, for example, in the form of light and shade image information.

Figure 2C:
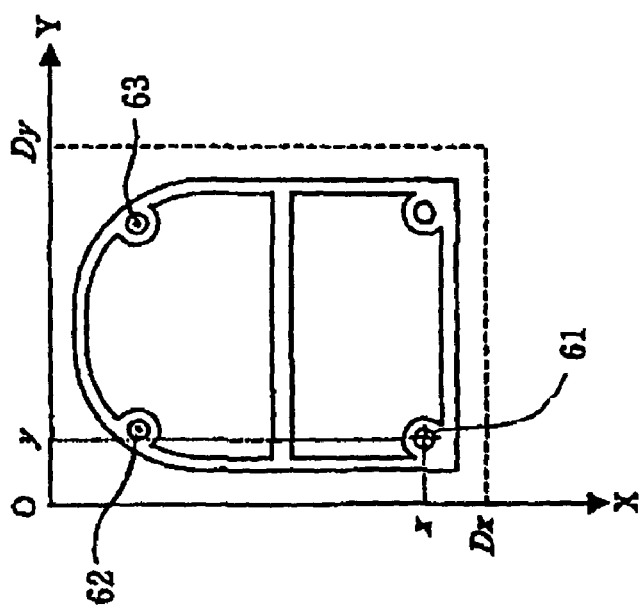
FIG. 2c shows an example of reference points 61 to 63 defined on the two-dimensional taught model.
Figure 2B:
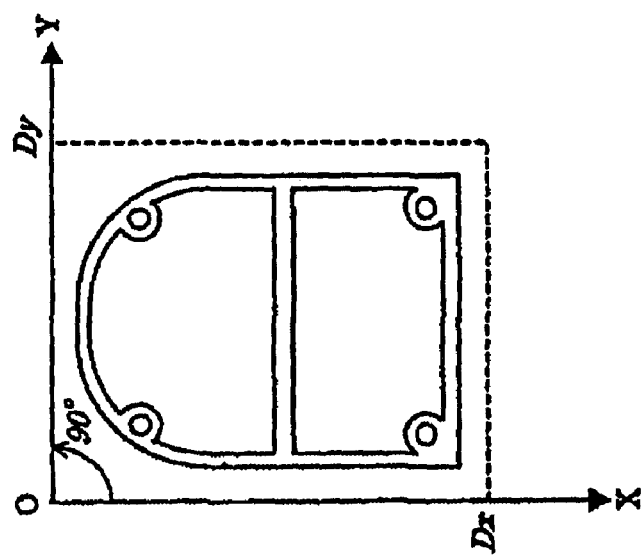
FIG 2b shows an example of a two-dimensional taught model which is stored as model information 20 for the workpiece.
Figure 2A:
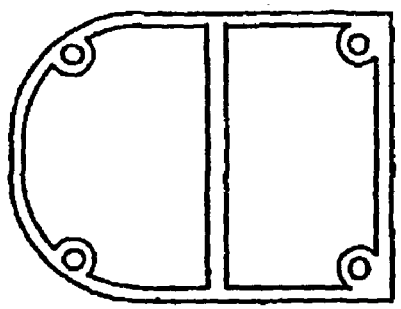
FIG. 2a shows an example of a workpiece (two-dimensional image)

FIG. 2c shows an example of reference points 61 to 63 defined on the two-dimensional taught model. Generally, the number of reference points defined on one model is an appropriate number not smaller than three. As mentioned above, the positions of the reference points 61 to 63 are chosen, for example, on the monitor attached to the image processor 50.

Next, stereo image processing will be explained. Pictures taken by the video cameras 1 and 2 are sent to object detecting sections 3, 4, respectively. Each of the object detecting sections 3, 4 detects images of workpieces in the picture received. For this detection, for example, the above-mentioned normalized correlation detection or the like is performed, using the model information 20. The detailed explanation of the detection of an object will be omitted, since various known techniques can be applied to it.

Information on the positions of workpieces on each of the images detected by each of the object detecting sections 3, 4 is sent to a corresponding image determining section 5. The corresponding image determining section 5 identifies which one of images of workpieces detected in one of the pictures corresponds to which one of images of workpieces detected in the other picture, as images of the same workpiece.

Figure 3B:
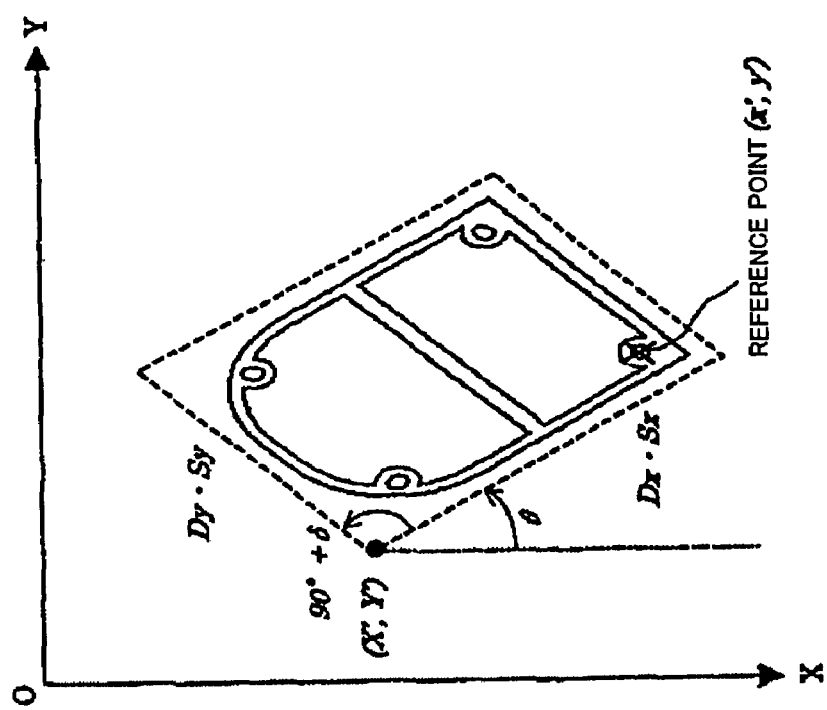
FIG. 3b is an example of a variable transformed model prepared by performing a variable geometrical transformation on the two-dimensional taught model.
Figure 3A:
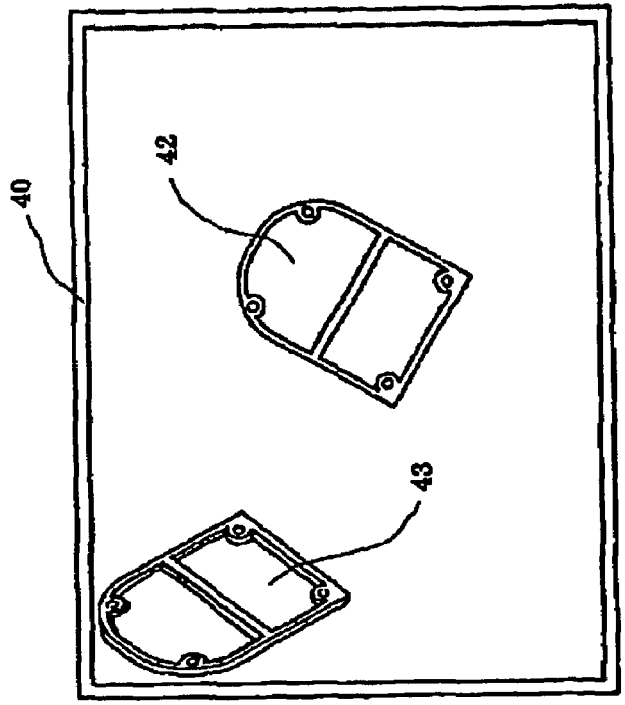
FIG. 3a is a picture of workpieces in a workpiece container, of which one is in a horizontal position and the other is in a slanting position, taken by one of video cameras.
Figure 4:
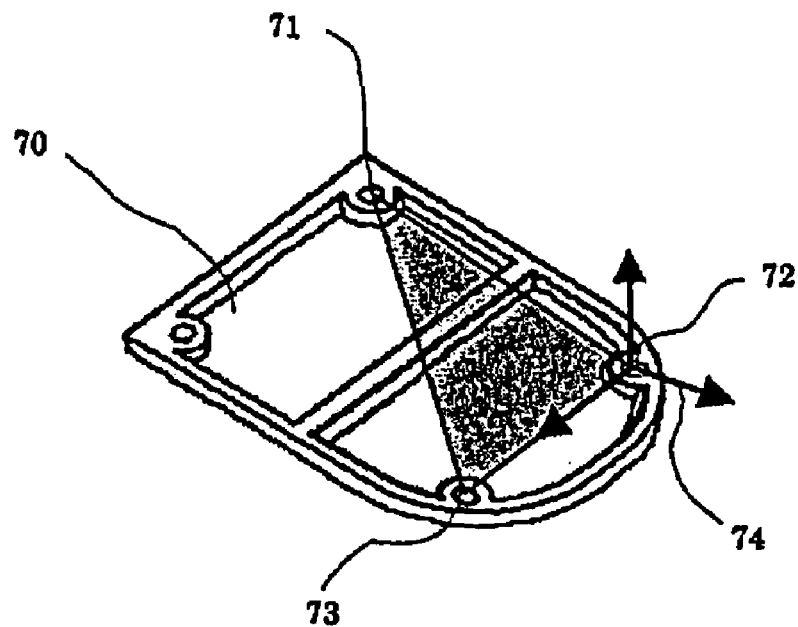
FIG. 4 is an illustration for explaining three reference points on a workpiece and a coordinate system fixed on the basis of them.

Next, referring also to FIGS. 3a and 3b, the detection of an object and the identification of images of the same object will be explained more in detail. FIG. 3a shows a picture taken by one of the video cameras 1 and 3 which includes an image 42 of a workpiece which lies in a horizontal position in a workpiece container 40 and an image 43 of a workpiece which lies in a slanting position in the workpiece container 40. It is to be noted that these images are presented as typical examples of images of workpieces placed in the workpiece container 40. The workpiece can assume various slanting positions, and the image of the workpiece can vary depending on the direction from which the picture is taken by the video camera.

Hence, for detecting workpieces, either a model (hereinafter referred to as "a variable transformed model") is prepared by variably performing a geometrical transformation on the two-dimensional taught model shown in FIG. 2b or a picture (hereinafter referred to as "a variable transformed picture") is prepared by variably performing a geometrical transformation on the two-dimensional picture shown in FIG. 2a.

As a variable transformation, one which can be represented by a set of parameters is employed. The set of parameters used in the present embodiment is (Sx, Sy, δ, θ, X', Y') as shown in FIG. 2b. The definitions of Sx, Sy, δ and θ will be given below. When a variable transformed picture is used, a geometrical transformation performed on the two-dimensional picture shown in FIG. 2(a) is likewise represented by a set of parameters (Sx, Sy, δ, θ, X', Y').

Sx: Scale in X-axis direction
Sy: Scale in Y-axis direction
δ: Angle between X-axis and Y-axis expressed using 90 degrees as a starting point of scale (δ=0)
θ: Angle of rotation
(X', Y'): Coordinates of an origin for a workpiece θ and (X', Y') indicate the orientation and position of a variable transformed model (or a variable transformed picture) in a two-dimensional plane (image coordinate system O-XY), respectively, and represent rotation and translational movement which have been performed on the original two-dimensional taught model (FIG. 2b) or the original two-dimensional picture (FIG. 2a). Here, these movements are also considered to be included in the "geometrical transformation" performed on a two-dimensional taught model or a picture. Hence, for convenience sake, these parameters are also considered to be included in the "parameter set".

Using the variable transformed model or variable transformed pictures prepared this way, detection such as normalized correlation detection is performed on the picture taken by the video camera 1 and the picture taken by the video camera 2.

Images of workpieces can be detected this way. For example, on the basis of the transformed model shown in FIG. 3b, the left-hand image 43 of a workpiece in FIG. 3a is detected, and the values which the parameters included in the parameter set (Sx, Sy, δ, θ, X', Y') had when the image 43 was detected are obtained.

The corresponding image determining section 5 (FIG. 1) notes four of these parameters, namely Sx, Sy, δ and θ. If the four parameters regarding an image detected by the object detecting section 3 and the four parameters regarding an image detected by the object detecting section 4 have close values, those two images are chosen as a pair of images which is likely to be a pair of images of the same workpiece. If there are more than one pairs of images which are thought likely to be pairs of images of the same particular workpiece, the possible pairs of images are narrowed down, taking also geometrical restrictions 22 such as epipolar restriction (FIG. 1), which come from positional relationship between the visual axes of the video cameras 1, 2, into consideration.

If there still remain more than one possible pairs of images, the most likely pair can be chosen by evaluating the result of correlation detection performed on the two pictures, regarding their parts around the possible pairs of images.

After the corresponding images are identified this way, the reference point positions calculating section 6, 7 calculate, on their related pictures, the positions of the reference points on each of the images identified as the corresponding images. Calculation formulas will be, for example, as shown below. What the signs in the formulas represent are shown in FIG. 3b.

$$x' = X' + x \cdot Sx \cdot \cos\theta + y \cdot Sy \cdot \cos(\theta + 90° + \delta)$$

$$y' = Y' + x \cdot Sx \cdot \sin\theta + y \cdot Sy \cdot \sin(\theta + 90° + \delta)$$

The parameter set presented here is only an example. Determination of corresponding images may be performed using a parameter set which represents perspective transformation or affine transformation to be performed on the two-dimensional taught model or two-dimensional pictures.

When the positions of the reference points on each picture are obtained this way, the visual line from each of the video cameras 1, 2 to each of the reference points on a workpiece can be obtained. Thus, the three-dimensional positions of the points on the actual workpiece which correspond to the reference points 61 to 63 can be calculated. The calculation of the three-dimensional positions is performed by a position/orientation calculating section 8. A detailed explanation of a specific way of calculating the three-dimensional positions will be omitted, since known stereo-mode techniques can be applied to the calculation.

For each workpiece, the position/orientation calculating section 8 calculates the three-dimensional positions of the three or more reference points defined in advance. For example, when there are three reference points (reference points 61 to 63 on the model), the three-dimensional positions of three reference points 71, 72, 73 shown in FIG. 4 (which correspond to the reference points 61, 62, 63, respectively) are calculated, and on the basis of the three-dimensional position/orientation of a triangle determined by these three-dimensional positions, for example, a coordinate system denoted by reference numeral 74 is obtained. The obtained coordinate system uniquely represents the position/orientation of the workpiece 70.

Figure 5:
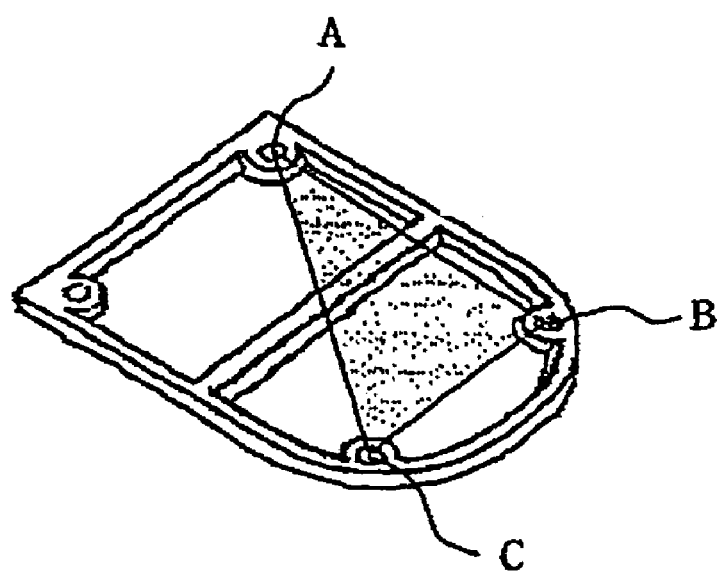
FIG. 5 is an illustration for explaining an example in which identification is performed through defining a triangle.

Instead of using three or more reference points, for example, as shown in FIG. 5, it is also possible to define an imaginary triangle ABC on an object, and then define a corresponding triangle on a two-dimensional taught model of the object, for use in identifying images. From the triangle, information equivalent to the information extracted from the three reference points can be extracted. In this case, triangle setting sections are used in place of the reference points setting sections 11, 12, and information to specify the position of the triangle (for example, equations representing lines corresponding to the three sides of the triangle) is determined in place of the positions of the three reference points.

Data (X, Y, Z, W, P, R) on the three-dimensional position/orientation of the workpiece 41 obtained in the above-described manner is sent to the robot controller 30, and on the basis of it, the robot 31 operates to pick up the workpiece. Since techniques are known about how to handle the workpiece whose three-dimensional position/orientation is known, a detailed explanation of it will be omitted.

In the present invention, determination of corresponding images is performed through stereo-mode image processing, not on a local feature basis but on a to-be-detected object basis. Further, the detected facts on each object are utilized as restrictions for identification of the image. This helps improve the reliability of the identification. Further, by utilizing reference points, the invention can deal with the case in which an object is of a simple shape having few geometrical features, and the case in which geometrical features of an object are partly hidden behind other things. Even in these cases, when positions of three or more reference points are obtained by calculation, the position/orientation of the object can be obtained. Thus, the invention enables stable detection of the position/orientation of an object and picking-up of the object on the basis of the detected position/orientation, in a wide range, Further, in the present invention, even when geometrical features including reference points of an object are hidden behind other things, the three-dimensional position/orientation of the object can be calculated as long as the positions of the hidden reference points can be obtained by calculation using the values of a set of parameters.

What is claimed is:

1. A position and orientation detecting device for detecting a three-dimensional position and orientation of an object based on two-dimensional images of the object taken from a plurality of different visual points, comprising:

defining means for defining two-dimensional taught models of the object and at least three reference points on the respective two-dimensional taught models;

image detecting means for detecting images of the object in each of the two-dimensional images by matching using said two-dimensional taught models;

corresponding image determining means for determining correspondence between the image detected in one of the two-dimensional images and the image detected in another one of the two-dimensional images;

reference point position calculating means for obtaining a position of each of the reference points on each of the detected images using positions of the reference points defined on the two-dimensional taught models; and three-dimensional position and orientation determining means for obtaining three-dimensional position of each of the reference points based on the obtained position of each of the reference points on each of the detected images, and determining the three-dimensional position and orientation of the object using the obtained three-dimensional positions of the reference points.

2. A position and orientation detecting device according to claim 1, wherein said image detecting means includes means for preparing variable two-dimensional taught models by performing a geometrical transformation represented by a set of parameters on the two-dimensional taught model, and detecting images of objects in each of the two-dimensional images using said variable two-dimensional taught models, and said reference point position calculating means includes means for obtaining the position of each of the reference points on each of the images based on values of the set of the parameters determined in detecting each of the images.

3. A position and orientation detecting device according to claim 2, wherein the set of parameters includes parameters representing affine transformation to be performed on the two-dimensional taught models.

4. A position and orientation detecting device according to claim 2, wherein the set of parameters includes parameters representing perspective transformation to be performed on the two-dimensional taught models.

5. A position and orientation detecting device according to claim 1, wherein said image detecting means includes means for preparing variable two-dimensional images by performing a geometrical transformation represented by a set of parameters on the two-dimensional images, and detecting images of objects in each of the variable two-dimensional images using said two-dimensional taught model, and said corresponding image determining means and said reference point position calculating means includes means for obtaining position of each of the reference points on each of the images before the geometrical transformation based on values of the set of the parameters determined in detecting each of the images.

6. A position and orientation detecting device according to claim 5, wherein the set of parameters includes parameters representing affine transformation to be performed on the two-dimensional images.

7. A position and orientation detecting device according to claim 5, wherein the set of parameters includes parameters representing perspective transformation to be performed on the two-dimensional images.

8. A position and orientation detecting device according to claim 1, wherein said at least three reference points are defined by a figure having fixed three-dimensional positional relationship with respect to the two-dimensional taught model.

9. A position and orientation detecting device according to claim 1, to be combined with a robot to constitute an object picking-up apparatus for picking up an object based on three-dimensional position and orientation of the object using the position and orientation detecting device.

10. A position and orientation detecting device for detecting a position and orientation of each of a plurality of objects of the same kind based on two-dimensional images of the plurality of objects taken from a plurality of different visual points, comprising:
    defining means for defining two-dimensional taught models of the objects and at least three reference points on the respective two-dimensional taught models;
    image detecting means for detecting images of one or more of the plurality of objects in each of the two-dimensional images by matching using the two-dimensional taught models;
    corresponding image determining means for determining which one of images detected in one of the two-dimensional images corresponds to which one of images detected in another one of the two-dimensional images as images of the same object;
    reference point position calculating means for obtaining a position of each of the reference points on each of the images determined as one of the images of the same object, using positions of the reference points defined on the two-dimensional taught models; and
    three-dimensional position and orientation detecting means for obtaining the three-dimensional position of each of the reference points based on the obtained position of each of said reference points on each of the two-dimensional images, and obtaining the three-dimensional position and orientation of each of the objects using the obtained three-dimensional positions of the reference points.

11. A position and orientation detecting device according to claim 10, wherein said image detecting means includes means for preparing variable two-dimensional taught models by performing a geometrical transformation represented by a set of parameters on the two-dimensional taught model, and detecting images of objects in each of the two-dimensional images using said variable two-dimensional taught models, and
    said reference point position calculating means includes means for obtaining the position of each of the reference points on each of the images based on values of the set of the parameters in detecting each of the images.

12. A position and orientation detecting device according to claim 11, wherein the set of parameters includes parameters representing affine transformation to be performed on the two-dimensional taught models.

13. A position and orientation detecting device according to claim 11, wherein the set of parameters includes parameters representing perspective transformation to be performed on the two-dimensional taught models.

14. A position and orientation detecting device according to claim 10, wherein said image detecting means includes means for preparing variable two-dimensional images by performing a geometrical transformation represented by a set of parameters on the two-dimensional images, and detecting images of objects in each of the variable two-dimensional images using said two-dimensional taught model, and
    said corresponding image determining means and said reference point position calculating means includes means for obtaining position of each of the reference points on each of the images before the geometrical transformation based on values of the set of the parameters determined in detecting each of the images.

15. A position and orientation detecting device according to claim 14, wherein the set of parameters includes parameters representing affine transformation to be performed on the two-dimensional images.

16. A position and orientation detecting device according to claim 14, wherein the set of parameters includes parameters representing perspective transformation to be performed on the two-dimensional images.

17. A position and orientation detecting device according to claim 10, wherein said at least three reference points are defined by a figure having fixed three-dimensional positional relationship with respect to the two-dimensional taught model.

18. A position and orientation detecting device according to claims 10, to be combined with a robot to constitute an object picking-up apparatus for picking up an object based on three-dimensional position and orientation of the object using the position and orientation detecting device.

* * * * *